United States Patent

Kahn

[15] 3,688,197

[45] Aug. 29, 1972

[54] COMMUNICATION SYSTEM WITH SELECTION MEANS FOR DETERMINING THE MODULATION MODE OF A RECEIVED SIGNAL

[72] Inventor: Leonard R. Kahn, Freeport, N.Y.

[73] Assignee: Kahn Research Laboratories, Inc., Freeport, Long Island, N.Y.

[22] Filed: April 5, 1971

[21] Appl. No.: 131,098

Related U.S. Application Data

[63] Continuation-in-part of Ser. No. 758,560, Sept. 9, 1968, Pat. No. 3,588,701.

[52] U.S. Cl. ...................325/315, 325/329, 325/316

[51] Int. Cl. ...............................................H04b 1/16

[58] Field of Search..........325/7, 45, 47, 49, 50, 315, 325/316, 329, 330, 337, 344, 347, 349; 329/111, 135

[56] References Cited

UNITED STATES PATENTS

| | | | |
|---|---|---|---|
| 3,593,149 | 7/1971 | Worcester | 325/329 |
| 2,383,847 | 8/1945 | Crosby | 325/347 |
| 2,413,977 | 1/1947 | Koch | 325/315 X |
| 2,416,795 | 3/1947 | Crosby | 325/316 |
| 3,345,571 | 10/1967 | Selwyn | 325/330 X |

*Primary Examiner*—Robert L. Richardson
*Attorney*—Albert F. Kronman

[57] ABSTRACT

A communication system which includes a receiver capable of receiving signals having (1) amplitude modulation, (2) single sideband with full carrier and (3) single-sideband with reduced or (4) suppressed carrier. A selection circuit automatically senses the modulation mode of the received signal and thereby controls the selection of the receiver circuit and the selection of a transmitter circuit if desired. Squelch circuitry is also provided to disable the receiver output when the signal-to-noise ratio of the received signal is below a predetermined value.

13 Claims, 2 Drawing Figures

INVENTOR.
LEONARD R. KAHN
BY Albert F. Kronman
ATTORNEY

COMMUNICATION SYSTEM WITH SELECTION MEANS FOR DETERMINING THE MODULATION MODE OF A RECEIVED SIGNAL

CROSS REFERENCE TO RELATED PATENT

This application is a continuation-in-part of application Ser. No. 758,560, filed Sept. 9th, 1968 by Leonard R. Kahn U.S. Pat. No. 3,588,701 issued June 28th, 1971.

BACKGROUND OF THE INVENTION

This invention relates to communications systems where a single communications channel utilizes more than one type of modulation. The improvements of the invention include circuits in the receiver for automatically sensing the modulation mode of a received signal and responsively controlling the detection circuitry to be compatible with the modulation mode. Also, the circuit generates a transmitter control signal, which transmitter control signal may be employed to establish a compatible operating mode in an associated transmitter means.

In radio and other high frequency communication systems, it has been common practice to equip the receiver and transmitter stations with circuits which have the ability of receiving and transmitting signals having various types of modulation. Generally, these stations are manually controlled to the extent that an operator observes the modulation mode of the received signal and then manually switches the signal to a compatible detection circuit. The operator may also activate a transmitter circuit so that the responding wave transmission is in the same modulation mode. However, such a system requires that an operator continually monitor the equipment and quickly perform the required switching changes.

U.S. Pat. No. 3,401,341, issued to L.R.Kahn discloses and claims a means for automatic switching of a receiver in such a system to provide automatic sensing of the modulation mode of the receiver and the automatic detection thereof. However, such a system can still require an operator to be present to conform the associated transmitter circuit. The circuitry disclosed in U.S. Pat. No. 3,401,341 does not provide means for insuring that the receiver is insensitive to impulse noise energy.

To overcome the above discussed deficiency, the improvement of the present invention provides an automatic sensing means to determine the modulation mode, sensing the adequate signal presence, and then automatically controlling the detection circuits of the receiver to operate in the same modulation mode. The present invention also provides a signal for automatic switching of a transmitter to operate in the same modulation mode.

A feature of the present invention is a detection circuit which differentiates between an amplitude modulation signal, a signal with single sideband and full carrier, a signal with single sideband and reduced carrier, and a signal with single sideband and suppressed carrier.

DESCRIPTION OF THE PREFERRED EMBODIMENT

Figure 1:
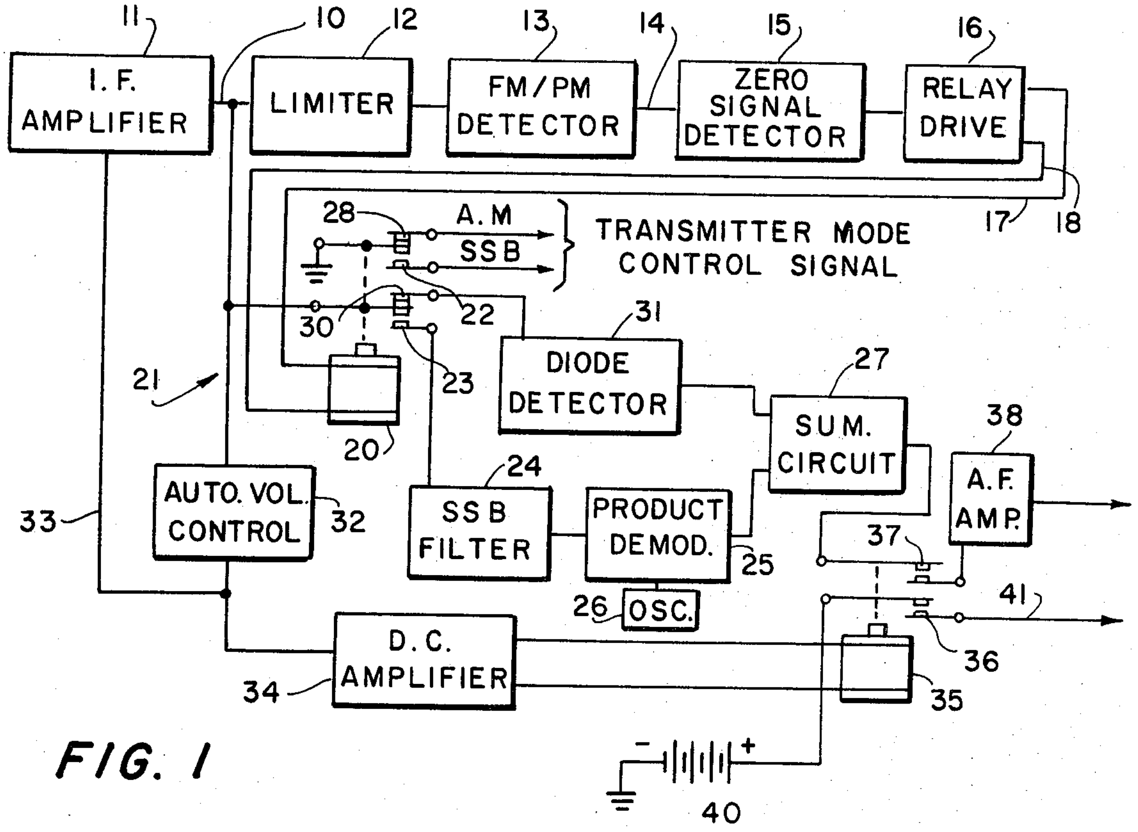
FIG. 1 is a schematic diagram of connections, of a receiver which is differentially responsive to received signals having either amplitude modulation or single-sideband modulation. The sensing system in this case involves a so-called zero signal detection circuit.

In Figure 1, an input signal is applied over conductor 10 from an intermediate frequency amplifier 11 which includes a carrier plus the upper sideband. The signal is first limited in amplitude by limiter 12 and then sent to a FM/PM detector 13, the output from which is applied over conductor 14 to a zero signal detector 15 to obtain a control signal. The control signal is applied to a relay drive circuit 16 which may be a direct current amplifier. The output of the drive circuit is applied by conductors 17, 18, to a winding 20 of a relay 21 having two sets of double throw contacts.

As is well known, a single-sideband signal has a phase modulation component, whereas an amplitude modulation signal has no frequency or phase modulation component. If the received signal is of the single-sideband type, the output on conductor 14 from detector 13 has a positive energy content so that the output from the zero signal detector 15 is positive. This signal controls relay 21 to close contacts 22 and 23 and to activate a power circuit in the single-sideband transmitter circuit. Also, the intermediate amplifier signal is applied to a filter circuit 24 and a product demodulator 25 (with associated conventional local carrier oscillator 26). The demodulated wave is then sent to a summation circuit 27.

If the received signal is amplitude modulated, the detector 13 produces no output on conductor 14 and no output from the zero signal detector 15, so that the relay 21 remains in its normal condition. The AM contacts 28 are closed and the transmitter circuit is signaled for AM operation. Contacts 30 on the relay 20 are also closed and the signals from the intermediate amplifier 11 are sent to diode detector 31 where the audio frequencies are produced and then sent to the summation circuit 27.

Many communications receivers incorporate squelch systems. Some of these systems operate on a signal-to-noise basis. For example, U.S. Pat. No. 3,337,808 issued to L. R. Kahn. Such squelch circuits in addition to their normal function can be useful in avoiding the unnecessary mode switching of the associated transmitter. A squelch utilized in the present invention can assure that the transmitter mode is not falsely switched during periods when no signal is being received and when the receiver mode may be incorrectly selected. A simple AVC type squelch circuit is shown in FIG. 1 which functions as follows: This squelch control circuit includes an automatic volume control (AVC) detector 32. This circuit 32 provides a negative feedback control voltage which is applied over conductor 33 to the I.F. amplifier 11 to keep the output level constant. The negative control voltage is also applied as an input to a direct current amplifier 34 which senses the signal strength of the received signal. When there is sufficient signal strength current is sent to winding 35, the relay is activated, and contacts 36 and 37 are both closed. Contacts 37 send the currents from the summation circuit 27 to an audio frequency amplifier 38. From there the audio output may be sent to a loud speaker, a recorder, or any other utilization means (not shown). The second contact 36 connects a power source 40 to a signal output line 41 which may be connected to part of a transmitting circuit to relay the received information. The signal on conductor 41 can also be termed a signal presence signal since it is available only when the received signal has the required signal strength.

Figure 2:
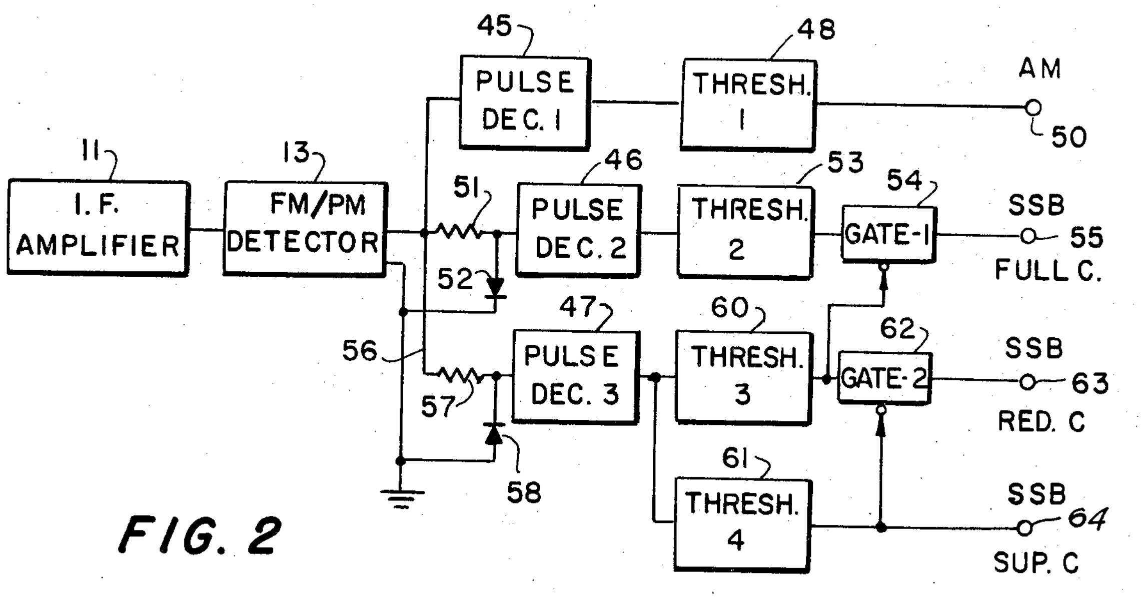
FIG. 2 is a schematic diagram of connections of a receiver which is differentially responsive to received signals having either amplitude modulation or single-sideband modulation with three types of carrier.

Referring now to FIG. 2, the circuit shows a detection means for determining the modulation mode of a signal which may have (1) amplitude modulation, (2) a single sideband with full carrier, (3) a single sideband with reduced carrier, and (4) a single sideband in which the carrier has been suppressed.

The signal is received as before by an intermediate frequency amplifier 11, the output of which is applied to a frequency modulation detector or discriminator 13. The output of the discriminator 13 is a function of the modulation method and is either free of pips or has only negative pips or has both positive and negative pips. The discriminator output is applied to three pulse detectors 45, 46, and 47. Pulse detector 45 is designed to detect and pass any type of pip, either positive or negative. If any pips are passed to threshold circuit 48, the circuit will produce no output voltage and the terminal 50 is devoid of any signal. Threshold circuit 48 may be constructed in several ways. It may include a double rectifier circuit connected to a bias circuit which normally passes current. When pips of either polarity are applied, the bias circuit cuts off the output current. Signals having amplitude modulation will produce no pips at the pulse detector circuit 45 and the threshold circuit will then send a voltage to the output terminal 50 indicating amplitude modulation. U.S. Pat. No. 2,976,411 discloses similar circuits and the details of pip generation.

Pulse detector 46 is connected in series with a dropping resistor 51 and a short circuiting diode 52. The output from detector 46 is connected to a threshold circuit 53, then to a normally closed gate circuit 54 and finally to a terminal 55. This series of circuits is designed to give a voltage signal at terminal 55 when a modulation wave of single sideband, full carrier, is received. The diode 52 shorts out the positive pips and allows the negative pips to pass to the pulse detector 46. When circuit 46 produces a negative output voltage, the threshold circuit 53 produces a negative voltage which is applied to gate 54 and then passed to terminal 55 provided the gate is not inhibited.

The remaining circuitry is designed to respond to modulation modes in which a single sideband is transmitted together with a carrier wave which has less level than the sideband signal or none at all. In both cases both positive and negative pips appear at the output of the discriminator. When a single-sideband signal with reduced carrier is received on conductor 56, resistor 57 and diode 58 eliminate the negative pips and positive pips are received by pulse detector 47. This detector circuit is connected to two threshold circuits 60 and 61. The third threshold circuit 60 is adjusted to operate at a lower level than the fourth circuit 61. With this adjustment, a relatively small number of positive pips will operate threshold circuit 60 but will not activate circuit 61.

The output from threshold circuit 60 is connected to and inhibit terminal in gate 54 and also to the input of a second gate 62. If, now a reduced carrier wave is received on conductor 56, having both positive and negative pips less than a maximum value, negative pips are sent through circuits 46 and 53 and positive pips are sent through circuits 47 and 60. However, since the output of circuit 60 inhibits gate 54 and no signal is applied to terminal 55. The positive pips pass through circuits 47, 60, and gate 62 and are applied to terminal 63.

If the positive and negative pips are quite large they indicate that the carrier wave is minimal or suppressed entirely. In this case the situation is the same as described above except that the larger pips activate circuit 61, causing an output voltage from circuit 61 and thereby sending an inhibit voltage to gate 62 to cut off conduction through the gate and prevent a voltage from reaching terminal 63. The same voltage which was applied to the inhibit terminal is also applied to terminal 64 to indicate the reception of a single-sideband wave with suppressed carrier.

The circuit shown in FIG. 2 can be used with a squelch circuit as shown in FIG. 1. Also, relays and transmitter control circuits may be combined as indicated in FIG. 1.

Of course, in those cases where it is unnecessary to distinguish between the four modes shown in FIG. 2 a simpler circuit may be used. For example, if it is unnecessary to distinguish between suppressed carrier and reduced carrier threshold circuit 61 may be deleted and terminal 63 will indicate whether either suppressed or reduced carrier signals are received.

As anoth example, it may be unnecessary to distinguish between AM and SSB full carrier. In this case the circuit would be arranged to differentiate between signals which produce positive going pulses and all other signals; i.e., AM and SSB full carrier.

It should be noted that in the above description we have considered the reception of upper sideband single-sideband signals. Of course, the same type of circuitry could be used for the reception of lower sideband signals by use of appropriate sideband filters and control circuitry that would respond to the opposite pip polarity without departing from the spirit of the invention. For example, in those instances where positive pips were expected in the upper side band reception case negative going pips would be received for a lower sideband reception.

Having thus fully described the invention, what is claimed as new and desired to be secured by Letters Patent of the United States, is:

1. A communications receiver system equipped to receive either a single-sideband type or an amplitude modulated type signal, the improvement which comprises: a limiter limiting the amplitude of said signals to a constant value, a frequency modulation detector for deriving a signal from the output of the limiter only when the modulation mode is a single-sideband type, said detector responsive solely to the characteristic of the phase modulation component, switching means having a control circuit coupled to said detector and a switch for applying said electrical signals to an amplitude modulation detector when an amplitude modulated wave is received and to a product demodulator when a sideband wave is received.

2. A receiver in accordance with claim 1 wherein said switching means includes a relay having a winding as the control circuit.

3. A receiver in accordance with claim 1 wherein a zero signal detector is connected in series between the frequency modulation detector and the relay armature.

4. A receiver in accordance with claim 1 wherein said intermediate frequency amplifier is coupled to an automatic volume control and wherein the output of the automatic volume control is applied to a switching means to cut off the audio signal whenever the volume control signal is less than a predetermined minimum.

5. A receiver in accordance with claim 3 wherein a direct current amplifier is connected in series between the volume control circuit and a relay winding 6. A receiver in accordance with claim 3 wherein a single sideband filter is connected between one of said relay contacts and the product demodulator.

7. In a communications receiver system equipped to receive an amplitude modulated signal or a single-sideband type of signal, the improvement which comprises:

a. a discriminator circuit for demodulating the signal;

b. a first channel connected to the discriminator circuit for detecting an amplitude modulation mode, said channel including a first pulse detector and a threshold detector which produces an output signal only when there is substantial absence of phase modulation components:

c. a second channel connected to the discriminator circuit for detecting a signal in the single-sideband mode with full carrier, and a second threshold detector which produces a positive signal only when there is a negative input signal and a normally open gate;

d. and a third channel also connected to the discriminator circuit for detecting a signal in the single-sideband mode with a carrier having an amplitude substantially less the the peak sideband amplitude, and a third threshold detector which produces a positive signal when there is a positive input signal, and a connection to an inhibit terminal for closing the gate whenever the third threshold circuit produces an output signal.

8. A receiver system as claimed in claim 7 wherein the second channel includes a diode for eliminating positive pips, and the third channel includes a diode for eliminating negative pips.

9. A receiver system as claimed in claim 7 wherein each of the three threshold circuits is connected to an output terminal for connection to a load circuit.

10. A receiver system as claimed in claim 8 wherein the third channel also includes a fourth threshold circuit connected to the third pulse detector, said fourth threshold adjusted for producing a positive output only when the pips from the third pulse detector are greater than a predetermined value, the output of the fourth threshold circuit connected to an output terminal and also to an inhibit terminal in a second gate connected between the third threshold circuit and the third output terminal for closing the second gate whenever there is an output signal from the fourth threshold circuit.

11. A communications system equipped to receive either a full carrier single-sideband signal and an amplitude modulated signal on a first circuit and reduced or suppressed carrier signals on a second circuit, means for determining the phase modulation characteristics of the signal, switching means responsive solely to the presence or absence of the phase modulation component for connecting the received signals to a first signal processing and detecting circuit when there is an absence of phase modulation or the phase modulation is one character, and for connecting the receiver signal to a second processing and detecting circuit when there is phase modulation of a second type.

12. A communications system equipped for receiving single-sideband signals of different carrier levels, indicating means comprising; circuit means for detecting the angular modulation mode of the received signals, classifying means responsive to the characteristic of the phase modulation components for identifying the type of signal as a function of its angular modulation characteristics, indicating means controlled by the classifying means to show the modulation mode of the received signal.

13. A communications system equipped for operation with more than one type of modulation method, means for detecting the angular modulation component of received signals, classifying means responsive to the angular modulation component for identifying the type of signal as a function of its angular modulation characteristic, and means for utilizing the signal identification to control the operation of associated equipment.

* * * * *